J. W. MASON,

Assignor to J. STEIGER.

Packing Lengths of Embroidery, Lace, &c.

No. 9,641. Reissued April 5, 1881.

Witnesses

Chas H. Smith

J. Staib

Inventor

James W. Mason.

per Lemuel W. Serrell att'y.

N. PETERS, PHOTO-LITHOGRAPHER, WASHINGTON, D. C.

UNITED STATES PATENT OFFICE.

JAMES W. MASON, OF LONDON, ENGLAND, ASSIGNOR TO JACOB STEIGER, OF HERISAU, SWITZERLAND.

PACKING LENGTHS OF EMBROIDERY, LACE, &c.

SPECIFICATION forming part of Reissued Letters Patent No. 9,641, dated April 5, 1881.

Original No. 211,172, dated January 7, 1879. Application for reissue filed October 16, 1880. Patented in England July 3, 1878.

*To all whom it may concern:*

Be it known that I, JAMES WILLIAM MASON, of Bread Street, in the city of London, England, have invented new and useful Improvements in Packing Lengths of Embroidery, Lace, and other such like articles, which improvements are fully set forth in the following specification, reference being had to the accompanying drawings.

Hitherto it has been usual to wind embroidery, lace, and such like articles on a card, thereby necessitating the opening of the parcel containing the article so wound in order to take off any desired length, by which the article is liable to get spoiled by continual handling and exposure, and the parcel becomes unfit for exhibition.

The object of this invention is to card or pack lengths of embroidery, lace, and such like articles in such a way that any desired length may be withdrawn from the whole without opening or destroying the outside cover of the parcel or wrapper, or if in a flat box without opening the same.

In carrying out my invention the embroidery or other article is folded back and forth and placed upon a card or backing, or between two cards or pieces of stout paper, and the article is kept in position so that the embroidery may be withdrawn through an opening provided for it. The external wrapper or inclosure is paper, and it is fastened around the embroidery, a certain distance being left open at one side or end, through which one end of the length of embroidery can protrude. The other end of the embroidery is laid so that it can be inspected without opening the package.

In order to withdraw any desired length of the embroidery or other article contained in the said parcel, it is simply necessary to pull the aforsaid protruding end, by which any required length may be withdrawn without liability of entanglement, exposing, or handling of the remainder of the article, thus keeping the whole fresh and clean.

Figure 1:
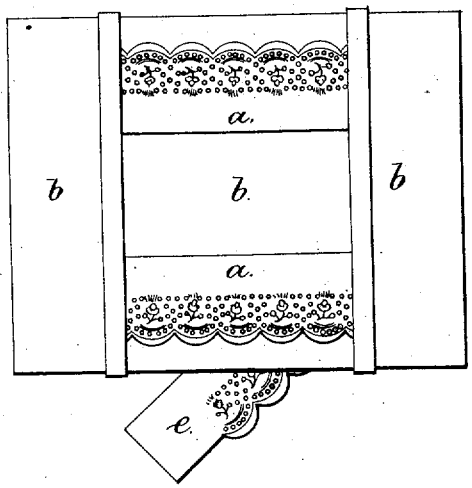
Figure 2:
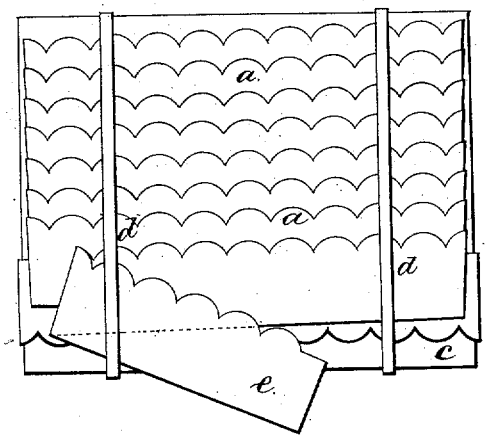
Figure 3:
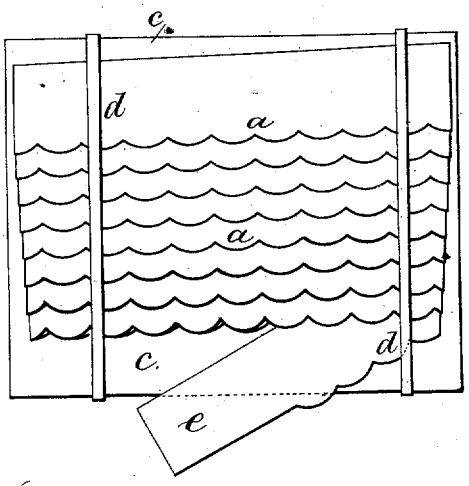
Figure 4:
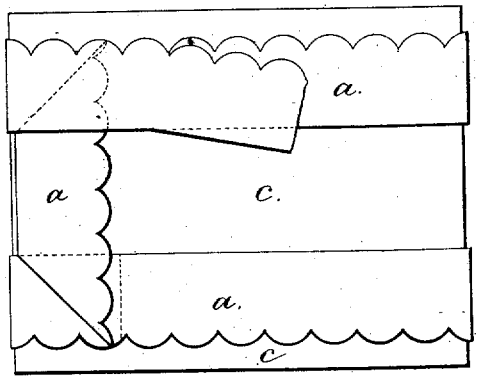

The pattern or design of the article contained in the parcel may be exhibited on the exterior by allowing one or more folds to pass outside the same, forming a show-card, as at *a a*, Figure 1, which shows a card or package of embroidery or other article complete. Fig. 2 shows the card without the outside wrapper, but having the embroidery or other article thereon folded according to this invention. Fig. 3 shows a similar view, but having the article folded in another way, according to this invention. This way of folding may be effected by winding the article round a piece of card, metal, or other suitable material, and afterward withdrawing the said piece, thus leaving the article folded and ready to be packed up, as described. Fig. 4 represents a view of the card, showing how a part of the embroidery or other article is passed round the card in order to exhibit the pattern on the outside of the wrapper.

*a* is the embroidery, lace, or other like article. *b* is the outside wrapper. *c* is the card or piece on which the embroidery or other article is placed. *d d* are bands (by preference india-rubber) passed round the card and over the embroidery or other article, to keep such article in position when it is being withdrawn. *e* shows the end of the article which protrudes outside the outer wrapper through a narrow part or opening left for the purpose, and merely requires pulling in order to withdraw the same from the closed package, by which means any portion of the whole may be withdrawn, with the exception of the short length at the end, which is passed round the card, in order to exhibit the pattern of the article outside, as shown at *a a*, Fig. 1.

I claim as my invention—

1. The combination, with folded embroidery or like article, of a backing or card upon which the folded strip is laid and means for keeping the folded portion of the strip in shape upon said backing by elastic pressure, the embroidery being adapted to be unfolded by pulling upon one end of the strip, substantially as set forth.

2. The combination, with folded embroidery or like article, of a backing or card upon which the folded strip is laid and an external wrapper having an opening for the withdrawal of said strip, the embroidery being adapted to be unfolded and withdrawn through said opening by pulling upon one end of the strip, substantially as set forth.

3. The combination, with folded embroidery or like article, of a backing or card upon which the folded strip is laid and an external wrapper having an opening for the withdrawal of such embroidery, and upon the surface of which wrapper a portion of such embroidery is exposed, substantially as set forth.

4. The package for embroidery or like article having a backing of card for the folded embroidery, bands for holding such embroidery in place, and an external wrapper or envelope that is partially open to allow the embroidery to be withdrawn by one of its ends, substantially as set forth.

Signed by me this 31st day of July, A. D. 1880.

JAMES WILLIAM MASON.

Witnesses:
ROBERT H. JOSLING,
JOSEPH RENAL.